United States Patent [19]
Bowes et al.

[11] Patent Number: 5,157,191
[45] Date of Patent: Oct. 20, 1992

[54] MODIFIED CRYSTALLINE ALUMINOSILICATE ZEOLITE CATALYST AND ITS USE IN THE PRODUCTION OF LUBES OF HIGH VISCOSITY INDEX

[75] Inventors: Emmerson Bowes, Hopewell; David S. Shihabi, Pennington, both of N.J.

[73] Assignee: Mobil Oil Corp., Fairfax, Va.

[21] Appl. No.: 756,668

[22] Filed: Sep. 9, 1991

Related U.S. Application Data

[60] Division of Ser. No. 522,485, May 14, 1990, Pat. No. 5,080,878, which is a continuation of Ser. No. 378,108, Jul. 11, 1989, abandoned, which is a continuation-in-part of Ser. No. 266,308, Oct. 31, 1988, abandoned, which is a continuation of Ser. No. 110,058, Oct. 13, 1987, abandoned, which is a division of Ser. No. 815,961, Jan. 3, 1986, abandoned, said Ser. No. 378,108, is a continuation-in-part of Ser. No. 122,612, Nov. 16, 1987, abandoned, which is a division of Ser. No. 54,108, May 20, 1987, abandoned, which is a continuation of Ser. No. 816,168, Jan. 3, 1986, abandoned.

[51] Int. Cl.$^5$ ................................................. C07C 2/12
[52] U.S. Cl. ........................................................ 585/533
[58] Field of Search ............................................. 585/533

[56] References Cited

U.S. PATENT DOCUMENTS

| | | | |
|---|---|---|---|
| 4,500,421 | 2/1985 | Chang et al. | 208/116 |
| 4,503,023 | 3/1985 | Breck et al. | 423/328 |
| 4,540,841 | 9/1986 | Miale et al. | 585/640 |
| 5,080,878 | 1/1992 | Bowes et al. | 423/328 |

Primary Examiner—Asok Pal
Attorney, Agent, or Firm—Alexander J. McKillop; Charles J. Speciale; Edward F. Kenehan, Jr.

[57] ABSTRACT

The catalytic activity of a crystalline aluminosilicate zeolite having a Constraint Index of from about 1 to about 12 for a variety of hydrocarbon conversions including the oligomerization of olefins to provide high viscosity index lubes is significantly enhanced by modifying the catalyst to reduce surface acid sites. This is accomplished by contacting the zeolite with a fluorosilicate salt to extract surface zeolitic aluminum which is replaced by silicon.

13 Claims, No Drawings

MODIFIED CRYSTALLINE ALUMINOSILICATE ZEOLITE CATALYST AND ITS USE IN THE PRODUCTION OF LUBES OF HIGH VISCOSITY INDEX

CROSS-REFERENCE TO RELATED APPLICATIONS

This application is a division of copending U.S. application Ser. No. 522,485, filed May 14, 1990, now U.S. Pat. No. 4,080,878, which is a continuation of U.S. application Ser. No. 378,108, filed July 11, 1989, now abandoned.

Said Ser. No. 378,108 is a continuation-in-part of U.S. application Ser. No. 266,308, filed Oct. 31, 1988, now abandoned, which is a continuation of U.S. application Ser. No. 110,058, filed Oct. 13, 1987, now abandoned, which is a division of U.S. application Ser. No. 815,961, filed Jan. 3, 1986, now abandoned.

Said Ser. No. 378,108 is also a continuation-in-part of U.S. application Ser. No. 122,612, filed Nov. 16, 1987, now abandoned, which is a division of U.S. application Ser. No. 054,108, filed May 20, 1987, now abandoned, which is a continuation of U.S. application Ser. No. 816,168, filed Jan. 3, 1986, now abandoned.

This application is also related to U.S. application Ser. No. 027,034, filed Mar. 19, 1987, now U.S. Pat. No. 4,876,411, which is a continuation of U.S. application Ser. No. 815,956, filed Jan. 3, 1986, now abandoned.

The entire disclosures of the above cross-referenced applications are expressly incorporated herein by reference.

BACKGROUND

The present invention relates to modification of a crystalline aluminosilicate zeolite catalyst having a Constraint Index of from about 1 to about 12, e.g. ZSM-5, to reduce external acid sites thereon and a process for preparing high viscosity index (VI) lubes employing the modified catalyst.

Zeolitic materials, both natural and synthetic, have been demonstrated in the past to have catalyst properties for various types of hydrocarbon conversion. Certain zeolitic materials are ordered, porous crystalline aluminosilicates having a definite crystalline structure as determined by X-ray diffraction within which there are a number of smaller cavities which may be interconnected by a number of still smaller channels or pores. These cavities and pores are uniform in size within a specific zeolitic material. Since the dimensions of these pores are such as to accept for absorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminsilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite Beta (U.S. Pat. No. 3,308,069); zeolite ZK-4 (U.S. Pat. No. 3,314,752); zeolite ZSM-5 (U.S. Pat. No. 3,702,886); zeolie ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); ZSM-38 (U.S. Pat. No. 4,046,859); and zeolite ZSM-23 (U.S. Pat. No. 4,076,882), merely to name a few.

U.S. Pat. No. 4,461,845 teaches a method for reactivating a steam-deactivated catalyst comprising a zeolite having a silicon/aluminum atomic ratio of at least 2. The method involves contact with an aluminum compound at elevated temperature, followed by contact with an aqueous acid solution. U.S. Pat. No. 4,477,582 teaches a method for reactivating a steam-deactivated catalyst comprising a zeolite having a silicon/aluminum ratio of at least 3.5. The method of this patent involves contact with an alkali, alkaline earth or transition metal salt solution followed by contact with an aqueous ammonium ion solution.

In accordance with U.S. Pat. No. 4,503,023, aluminum from $AlO_4$-tetrahedra of zeolites is extracted and substituted with silicon to form zeolite compositions having higher $SiO_2/Al_2O_3$ molar ratios. The preparative procedure involves contact of the starting zeolite having an $SiO_2/Al_2O_3$ molar ratio of about 3 or greater with an aqueous solution of a fluorosilicate salt using controlled proportions and temperature and pH conditions which are intended to avoid aluminum extraction without silicon substitution. The fluorosilicate salt serves as the aluminum extractant and as the source of extraneous silicon which is inserted into the zeolite structure in place of the extracted aluminum.

U.S. Pat. No. 4,427,790 describes a process for improving the activity of crystalline zeolites in which the zeolite in the "as synthesized" form or following ion-exchange is reacted with a compound having a complex fluoranion.

The use of chelating agents to remove framework and non-framework aluminum from faujasite materials is shown by G. T. Kerr, "Chemistry of Crystalline Aluminosilicates. v. Preparation of Aluminum Deficient Faujasites", 72 *J. Phys. Chem.*, 2594 (1968); T. Gross et al., "Surface Composition of Dealuminized Y Zeolites Studied by X-Ray Photoelectron Spectroscopy", 4 *Zeolites*, 25 (1984); and J. Dwyer et al, "The Surface Composition of Dealuminized Zeolites", 42 *J. Chem. Soc., Chem. Comm.* (1981)

Other references teaching removal of aluminum from zeolites include U.S. Pat. No. 3,442,795 and U.K. Patent No. 1,058,188 (hydrolysis and removal of aluminum by chelation); U.K. Patent No. 1,061,847 (acid extraction of aluminum); U.S. Pat. No. 3,493,519 (aluminum removal by steaming chelation); U.S. Pat. No. 3,591,488

(aluminum removal by steaming); U.S. Pat. No. 4,273,753 (dealuminization by silicon halides and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); German Patent No. 2,510,740 (treatment of zeolite with chlorine or chlorine-containing gases at high temperatures); Netherlands Patent No. 7,604,264 (acid extraction); Japan Patent No. 53/101,003 (treatment with EDTA or other materials to remove aluminum); and 54 J. Catalysis, 295 (1978) (hydrothermal treatment followed by acid extraction).

The zeolites in the conversion of olefins to provide lubricating oils is known, inter alia, from U.S. Pat. Nos. 4,520,221 and 4,585,517. In the former, surface acidity of a ZSM-5 zeolite catalyst is neutralized by treating with a sterically hindered base such as 2,6-di-tert-butylpyridine. Employing the base-modified catalyst, propylene was converted to lubes with a 60 VI number increase over a lube oil prepared with the unmodified catalyst. The base must be added continuously during the conversion process. At high reaction severities, the base will react with the feed, a practical limitation on the use of such a catalyst.

SUMMARY OF THE INVENTION

In accordance with the present invention, the surface acidity of a crystalline aluminosilicate zeolite catalyst having a Constraint Index of from about 1 to about 12 is reduced to provide a modified zeolite having enhanced catalytic activity for a variety of hydrocarbon conversions and, in particular, for the oligomerization of olefins to provide lubes of high viscosity index.

Thus, the present invention provides a process for modifying a crystalline aluminosilicate zeolite having a Constraint Index of from about 1 to about 12 which comprises contacting the zeolite with aqueous fluorosilicate salt to extract external zeolitic aluminum therefrom, said aluminum being replaced with silicon.

The foregoing treatment results in the reduction of acid sites on the surface of the zeolite essentially without affecting its internal structure. As a result, the incidence of undesirable side reactions tending to occur on the surface of the untreated catalyst and which result in lower product yield and/or inferior product characteristics is significantly lessened.

DESCRIPTION OF THE PREFERRED EMBODIMENTS

The crystalline zeolites which are modified in accordance with this invention are members of a novel class of zeolitic materials which exhibit unusual properties. Although these zeolites have unusually low alumina contents, i.e. high silica to alumina mole ratios, they are very active even when the silica to alumina mole ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by controlled burning at higher than usual temperatures to restore activity. These zeolites, used as catalysts, generally have low coke-forming activity and, therefore, are conducive to long times on stream between regenerations by burning with oxygen-containing gas such as air.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, zeolites having substantially higher silica/alumina ratios, e.g. 70 and above, may be used. The silica/alumina mole ratio of the zeolite may be 100 or less, e.g. from 20 to 100.

The novel class of zeolites, after activation, acquire an intracrystalline sorption capacity for normal hexane which is greater than that for water, i.e. they exhibit "hydrophobic" properties. This hydrophobic character can be used to advantage in some applications.

The novel class of zeolites to under modification as more fully described, infra. have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite shows constrained access. Other 12-ring structures may exist which may be operative for other reasons and, therefore, it is not the present intention to entirely judge the usefulness of a particular zeolite solely from theoretical structural considerations.

Rather than attempt to judge from crystal structure whether or not a zeolite possesses the necessary constrained access to molecules of larger cross-section than that of normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature adjusted between 290° C. and 510° C. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60% for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10%.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of at least 2 and up to 12. Constraint Index (CI) values for some typical zeolites including those which are useful herein are:

| ZEOLITE | C.I. (At test temperature) |
| --- | --- |
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-Alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index provides a definition of those zeolites which are suitable for modification in accordance with the method of this invention. The very nature of this parameter and the recited technique by which it is determined, however, admit of the possibility that a given zeolite can be tested under somewhat different conditions and thereby have different Constraint Indices. Constraint Index seems to vary somewhat with severity of operation (conversion) and the presence or absence of binders. Likewise, other variables such as crystal size of the zeolite, the presence of occluded contaminants, etc., may affect the contraint index. Therefore, it will be appreciated that it may be possible to so select test conditions as to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index in the range of 1 to 12 and therefore within the scope of the defined novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value used herein is an inclusive rather than an exclusive value. That is, a crystalline zeolite when identified by any combination of conditions within the testing definition set forth hereinabove as having a Constraint Index in the range of 1 to 12 is intended to be included in the instant novel zeolite definition whether or not the same identical zeolite, when tested under other defined conditions, may give a Constraint Index value somewhat outside the range of 1 to 12.

The class of zeolites defined herein as suitable for undergoing surface modification is exemplified by ZSM-5, ZSM-11, ZSM-12, ZSM-23, ZSM-35, ZSM-38, ZSM-48, and other similar materials.

ZSM-5 which is especially preferred is described in greater detail in U.S. Pat. No. 3,702,886 and U.S. Patent No. Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-22 is described in U.S. Pat. No. 4,556,477. The entire description thereof is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,375,573. Such a description includes the X-ray diffraction pattern for ZSM-48.

It is to be understood that by incorporating by reference the foregoing patents to describe examples of specific members of the novel class with greater particularity, it is intended that indentification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents and patent applications should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive, possibly because the intracrystalline free space is occupied by organic cations from the forming solution. They may be activated by heating in an inert atmosphere at 540 C for one hour, for example, followed by base exchange with ammonium salts followed by calcination at 540.C in air. The presence of organic cations in the forming solution may not be absolutely essential to the formation of this special class of zeolite; however, the presence of these cations does appear to favor the formation of this special class of zeolite. More generally, it is desirable to activate this type catalyst by base exchange with ammonium salts followed by calcination in air at about 540° C. for from about 15 minutes to about 24 hours.

Natural zeolites may sometimes be converted to zeolite structures of the class herein identified by various activation procedures and other treatments such as base exchange, steaming, alumina extraction and calcination, alone or in combination. Natural minerals which may be treated include ferrierite, brewsterite, stilbite, dachiardite, epistilbite, heulandite, and clinoptilolite. However, preferred crystalline zeolites for utilization herein include ZSM-5, ZSM-11, ZSM-12, ZSM-22, ZSM-23, ZSM-35, ZSM-38 and ZSM-48 with the acid or ammonium form such as HZSM-5 or NH4/ZSM-5 being particularly preferred.

In a preferred aspect of this invention, the zeolites hereof are selected as those providing, among other things, a crystal framework density, in the dry hydrogen form, of not less than 1.6 grams per cubic centimeter. It has been found that zeolites which satisfy all three of the discussed criteria are most desired for several reasons. When hydrocarbon products or by-products are catalytically formed, for example, such zeolites tend to maximize the production of gasoline boiling range hydrocarbon products. Therefore, the preferred zeolites useful with respect to this invention are those having a Constraint Index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 19 of the article of "Zeolite Structure" by W. M. Meier. This paper, the entire contents of which are incorporated herein by reference, is included in *Proceedings of the Conference on Molecular Sieves*, London (1967), published by the Society of Chemical Industry, London (1968).

When the crystal structure in unknown, the crystal framework density may be determined by classical pycnometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity. Crystal framework densities of some typical zeolites, including some which are not within the purview of this invention, are:

| ZEOLITE | VOID VOLUME | FRAMEWORK DENSITY |
|---|---|---|
| Ferrierite | 0.28 cc/cc | 1.76 g/cc |
| Mordenite | .28 | 1.7 |
| ZSM-5,-11 | .29 | 1.79 |
| ZSM-12 |  | 1.8 |
| ZSM-23 |  | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been substantially depleted, e.g. to less than about 1.5 percent by weight of the alkali metal originally present, may be used.

In an optional first step of the method herein, an as-synthesized zeolite containing organic template material may be steamed in a known manner partially or completely to decompose the template material and at the same time to remove frame (zeolitic) aluminum, preferentially aluminum located at the surface of the zeolite. Steaming frequently results in the presence of a carbon residue which can be removed by calcining either immediately following the steaming operation or at some later stage in the method of this invention. Steaming may be carried out in accordance with conventional procedures and within conventional limits, none of the latter being particularly critical to the result. Thus, steaming can be carried out for from about 30 minutes to 100 hours at temperatures of from about 100° C. to about 600° C., at pressures ranging from subatmospheric to about 200 psi. The optional calcining step also contemplates known procedures and limits, e.g. temperatures of from about 200° C. to about 600° C. in an inert atmosphere of air, nitrogen, etc., for from about 1 minute to about 48 hours.

It is also within the scope of this invention before and/or after steaming to extract zeolitic aluminum by contacting the zeolite in the ammonium, alkali metal or hydrogen form with an aluminum complexing agent, e.g. in accordance with the procedures incorporated by reference herein. If this optional contacting step is carried out on a steamed zeolite, the latter will have been previously ammonium exchanged to substantially remove interior sodium. According to U.S. Pat. No. 4,093,560, a slurry of zeolite in the ammonium or alkali metal form is contacted with an aqueous solution of an ammonium or alkali metal salt, which upon acidification, yields an anion which complexes with zeolitic aluminum. The amount of zeolite contained in such slurry will generally be between about 5 and about 60 weight percent. The concentration of the applicable salt solution is usually between about 10 and about 50 weight percent. Suitable salts include the alkali metal and ammonium salts of ethylenediaminetetraacetic acid, such as disodium dihydrogen ethylenediaminetetraacetate and diammonium dihydrogen ethylenediaminetetraacetate; fluorides, such as sodium or ammonium fluoride; carboxylic and polycarboxylic acid salts, such as ammonium acid citrate; mixtures of such complexing agents, etc., including a complexing resin containing an aminodiacetate functional group.

The water soluble acid which is added to the zeolite-containing slurry may be inorganic or organic and of such concentration that the controlled addition thereto does not serve to reduce the pH thereof to below a point where the crystallinity of the zeolite would be adversely affected, i.e. to a pH of below about 3. It is essential that the acid employed be stronger than ethylenediaminetetraacetic acid and thus have a first ionization constant greater than $10^{-2}$.

Typical inorganic acids which can be employed include mineral acids such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level which could affect the crystallinity of some zeolites undergoing treatment. The acidity which the zeolite can tolerate will depend, at least in part, upon the silica/alumina ratio of the starting material. Generally, the pH in the reaction mixture should be greater than about 4 and preferably greater than about 4.5 where the silica/alumina ratio of the starting material is greater than about 2 but less than about 3. When the silica/alumina ratio of the starting material is greater than about 3 but less than about 6, the pH of the reaction mixture should be greater than about 3.

After the described treatment, the product may be water washed free of impurities, preferably with distilled water, until the effluent wash water has a pH within the approximate range of 5 to 8. The crystalline dealuminized products obtained by the method of this invention have substantially the same crystallographic structure as that of the starting aluminosilicate zeolite but with increased silica/alumina ratios.

Various other complexing agents can also be used, provided that they form stable chelates with aluminum. In the case of a complexing agent which is intended to form soluble complexes or chelates for ease of removal of aluminum from the aluminosilicate, the complexing agent should form a stable complex or chelated aluminum which is soluble in the medium, e.g. water, in which the complexing is carried out. For a comprehensive review of complexing agents, see S. Chaberek and A. E. Martell, *Organic Sequestering Agents* (1959) and an article entitled "Chelation" by Harold F. Walton, *Scientific American*, 68–76 (1953), both of which are incorporated herein by reference.

The fluorosilicate salt employed herein to extract and replace zeolitic aluminum with silicon can be any of the water soluble fluorosilicate salts disclosed in U.S. Pat. No. 4,503,023, the contents of which are incorporated by reference herein. The step of contacting the zeolite which is in the ammonium or hydrogen form with aqueous fluorosilicate salt can be conducted in accordance with the procedures and within the limits set forth in said patent. However, unlike the limitations which must be observed in contacting the relatively unstable, large pore zeolites with which U.S. Pat. No. 4,503,023 is concerned with fluorosilicate salt, no similar precautions need be taken with the stable, medium pore zeolites employed herein.

The zeolite may be contacted with the fluorosilicate salt in an amount of at least 0.0075 moles per 100 grams of the zeolitic aluminosilicate on an anhydrous basis. The fluorosilicate salt may be in the form of an aqueous solution having a pH value within the range of 3 to about 7. The fluorosilicate salt may be brought into contact with the zeolitic aluminosilicate at a rate sufficiently slow to preserve at least 60 percent of the crystallinity of the starting zeolitic aluminosilicate.

Since the zeolite is contacted with the fluorosilicate salt under conditions sufficient to remove zeolitic aluminum, the zeolite should not be composited with an aluminum-containing binder during this contact. If the zeolite is composited with an aluminum-containing binder, the fluorosilicate may cause migration of aluminum from the binder into the zeolitic framework. Accordingly, one way of contacting the zeolite with the fluorosilicate salt involes the use of a binder-free zeolite during this contact.

The fluorosilicate salt may be represented by the formula:

wherein "A" is a metallic or non-metallic cation other than H+ having the valence "b". Cations represented by "A" are alkylammonium, $NH_4^+$, $Mg^{++}$, $Li^+$, $Na^+$, $K^+$, $Ba^{++}$, $Cd^{++}$, $Cu^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$. The ammonium cation form of the fluorosilicate is preferred because of its substantial solubility in water and also because the ammonium cations form water soluble by-product salts upon reaction with the zeolite, namely $(NH_4)_3AlF_6$.

Following treatment with fluorosilicate salt, the zeolite is further treated as may be necessary to provide the hydrogen form, e.g. by calcining the ammonium form of the catalyst in a known manner.

The modified zeolite of the present invention is useful as a catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to aout 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

As previously indicated, modified crystalline aluminosilicate zeolite of this invention is especially advantageous for use in catalyzing the conversion of lower olefins to provide high viscosity lubes, an example of which is given below. Suitable lower olefins generally include $C_2$ to $C_8$ olefins with propylene and butylene or mixtures thereof being preferred. However, higher olefins can be used, but for greater cost effectiveness the inexpensive lower olefins are preferable.

Shape-selective oligomerization, as it applies to the conversion of $C_2$-$C_{10}$ olefins over ZSM-5 under certain conditions, is known to produce higher olefins up to $C_{30}$ and higher. As reported by Garwood in "Intrazeolite Chemistry 23", *Amer. Chem. Soc.* (1983), reaction conditions favoring higher molecular weight product are low temperature (200°-260° C.), elevated pressure (about 2000 kPa or greater), and long contact time (less than 1 WHSV). The reaction under these conditions proceeds through the acid-catalyzed steps of (1) oligomerization, (2) isomerization-cracking to a mixture of intermediate carbon number olefins, and (3) interpolymerization to give a continuous boiling product containing all carbon numbers.

The following examples are further illustrative of the invention.

EXAMPLE 1

This example illustrates the preparation of a modified crystalline aluminosilicate zeolite catalyst in accordance with the present invention.

150 ml of a 0.11 N ammonium fluorosilicate solution were added to a zeolite water slurry containing 14 gm binder-free $NH_4ZSM$-5 extrudate and 200 ml deionized water. Following the addition of the $(NH_4)_2SiF_6$ solution, the reaction mixture was digested at 85°-95° C. for 17 hours. The product was washed and calcined to provide the modified zeolite herein in the hydrogen form. Analysis of the starting zeolite and the modified catalyst is shown in Table 1.

TABLE 1

|  | Starting $NH_4ZSM$-5 | Modified ZSM-5 |
|---|---|---|
| $SiO_2/Al_2O_3$ | 70 | 106 |
| Exchange capacity MEQ/gm | about 0.44 | 0.31 |
| Hexane cracking | — | 128 |

COMPARATIVE EXAMPLE 16 grams of as-synthesized tetrapropylammonium (TPA) bromide-containing ZSM-5 binder-free extrudate of 70/1 silica to alumina ratio was slurried with 0.5 gm disodium ethylene diamine tetraacetic acid ($Na_2EDTA$) in 400 ml $H_2O$ (pH adjusted to 2.5 with 0.2 N HCl) for 26 hours at room temperature. Following decantation of the liquid, the catalyst was washed with water, dried at 130° C. and calcined using a stream of 500 cc/min. $N_2$ and 50 cc/min. air with temperature increased 1° C./min. to 525° C. and held 10 hours. The calcined catalyst was exchanged with 1 N $NH_4NO_3$ soln and another $Na_2EDTA$ extraction was carried out for 8 hours. The resulting catalyst was washed with deionized water and calcined as above. Ammonia ion-exchange capacity was measured by TPAD, MEQ/gm Cat=0.42, $SiO_2/Al_2O_3$ about 79. In contrast, the fluorsilicate treatment procedure of Example 1 resulted in a much larger $SiO_2/Al_2O_3$ ratio of 106.

EXAMPLE 2

This example illustrates a process for oligomerizing an olefin, i.e. propylene, to provide a high viscosity index lube employing the surface-modified catalyst of Example 1 as compared to the same process carried out with an unmodified catalyst (steamed and unsteamed) of the same type.

Propylene was oligomerized over the catalysts in a stainless steel micro unit with a ⅜ ID reactor containing 15 cc catalyst under the conditions and with the results set forth in Table 2 as follows:

TABLE 2

Propylene Oligomerization
Temperature: 440° F.

| | Modified 100% HZSM-5 Extrudate Modified HZSM-5 | | | HZSM-5 Al₂O₃ Extrudate Unmodified 70/1 SiO₂Al₂O₃ HZSM-5 Alumina Extrudate Unsteamed | | Steamed 6 hrs. at 900° F. |
|---|---|---|---|---|---|---|
| Pressure, psig | 400 | 400 | 400 | 1500 | 1500 | 1500 |
| LHSV | 0.2 | 0.33 | 0.5 | 0.5 | 0.05 | 0.5 |
| Time on stream, days | 8 | 12 | 14 | | | |
| Lube Product, wt. % | 39 | 35 | 32 | 18 | 10 | 9 |
| VI | 83 | 86 | 93 | 73 | 70 | 43 |

The modified catalyst of this invention yields 32 wt. % 650° F.+ lube of 93 VI compared to the unmodified, unsteamed catalyst which gave only about 10 wt. % 650° F. lube of 70 VI. The unmodified, steamed catalyst yielded only 9 wt. % lube with 43 VI. The catalyst of this invention is clearly superior to the unmodified unsteamed and steamed catalysts with higher lube yield having significantly higher VI.

EXAMPLE 3

This example illustrates optional steaming and EDTA treatment steps.

As-synthesized NH₄ZSM-5 70/1 silica/alumina ratio, binder-free extrudate was subjected to an optional dealuminizing step by being slurried with 0.63 gm disodium ehtylene diamine tetraacetic acid (Na₂EDTA) in 250 ml water containing 50 ml of a 1N solution of NH₄NO₃ and 100 ml of a 2N solution of HNO₃ for 39 hours at ambient temperature. Following decantation of the liquid, the partially dealuminized zeolite was dried at 130° C. and thereafter subjected to steaming at 810° F. for 6 hours in 100% steam at one atmosphere. The steamed zeolite was base-exchanged with 150 ml of 1N NH₄NO₃, washed dried and calcined. Another optional dealuminizing oeration was carried out with 0.7 gm Na₂EDTA in 400 ml of water, adjusted to about pH 2 with 2N HNO₃ and the zeolite was thereafter washed, dried and calcined substantially as before. The characteristics of the zeolite at this point were as follows: alpha value=371, MEQ/gm cat.=0.35, SiO₂/Al₂O₃ ratio about 97. The zeolite was then slurried in a solution of 2 gm (NH₄)₂SiF₆ in 150 gm water and refluxed at 95° C. for 3 hours. A solution of 2 gm (NH₄)₂SiF₆ in 75 ml water was added and refluxing was continued for 16 hours. Following washing and calcining as before, a modified zeolite catalyst of reduced surface acidity was obtained with the following characteristics: alpha value=57, MEQ/gm=0.152, SiO₂/Al₂O₃ ratio about 220.

EXAMPLE 4

This example compares the use of the catalyst of Example 3 (modified HZSM-5) with the unmodified catalyst, both unsteamed and steamed, for the oligomerization of propylene. The propylene was oligomerized over the catalyst in a stainless steel micro unit with a  ID reactor containing 15 cc catalyst under the conditions and with the results set forth in the following table:

TABLE 3

Propylene Oligomerization
Temperature: 440° F.

| | Modified HZSM-5 | | | Unmodified 70/1 HZSM-5 Alumina Extrudate Unsteamed | | Steamed 6 hrs. at 900° F. |
|---|---|---|---|---|---|---|
| Pressure, psig | 400 | 400 | 400 | 1500 | 1500 | 1500 |
| LHSV | .5 | .4 | .33 | .5 | .5 | .5 |
| Time on steam, days | 13 | 16 | 20 | | | |
| Lube Product, wt. % | 11 | 12 | 11 | 18 | 10 | 9 |
| VI | 96 | 92 | 98 | 73 | 70 | 43 |

The modified catalyst of this invention yields 650° F.+ lubes of 98 VI. This is about 28 and 46 higher viscosity index than that obtained with unmodified, unsteamed and unmodified, and steamed ZSM-5, respectively.

What is claimed is

1. A process for the production of high viscosity index lubricating oils in high yields from lower olefin, said process comprising the steps of:
   (i) contacting said olefin with a modified crystalline aluminosilicate zeolite catalyst under conditions sufficient to provide a product comprising a lubricating oil; and
   (ii) recovering said lubricating oil, said modified crystalline aluminosilicate zeolite being prepared by contacting aluminosilicate zeolite with aqueous fluorosilicate salt to extract external zeolitic aluminum therefrom, without affecting the internal structure of the zeolite, said zeolite being selected from the group consisting of ZSM=5, ZSM-11, ZSM-12, ZSM-22, ZSM-23, ZSM-35, ZSM-38 and ZSM-48.

2. The process of claim 1, wherein the zeolite is in the ammonium form.

3. The process of claim 2, wherein the thus-contacted zeolite is further treated to provide the hydrogen form.

4. The process of claim 1, wherein the fluorosilicate salt is represented by the formula:

(A)$_{2/b}$SiF$_6$ wherein A is a metallic or non-metallic cation other than H+ having the valence b.

5. The process of claim 4, wherein A is alkylammonium, NH₄+, Mg++, Li+, Na+, K+, Ba++, Cd++, Cu+, Ca++, Cs+, Fe++, Co++, Pb++, Mn++, Rb+, Ag+, Sr++, Tl+ and Zn++.

6. The process of claim 1, wherein the fluorosilicate salt is (NH₄)₃SiF₆.

7. The process of claim 1, wherein the olefin is selected from the group consisting of propylene and butylene.

8. The process of claim 1, wherein said lubricating oil is a 650° F.+ lubricating oil.

9. The process of claim 8 further comprising the step of determining the viscosity index of said lubricating oil.

10. The process of claim 1, wherein said zeolite has a silica to alumina mole ratio of 100 or less.

11. The process of claim 1, wherein said zeolite has a silica to alumina mole ratio of 20 or more.

12. The process of claim 1, wherein said contacting takes place in the absence of an aluminum-containing binder material.

13. The process of claim 1, wherein said zeolite is binder-free.

* * * * *